(12) United States Patent
Hannuksela

(10) Patent No.: US 9,124,907 B2
(45) Date of Patent: Sep. 1, 2015

(54) PICTURE BUFFERING METHOD

(75) Inventor: Miska Hannuksela, Ruutana (FI)

(73) Assignee: Nokia Technologies Oy, Espoo (FI)

( * ) Notice: Subject to any disclaimer, the term of this patent is extended or adjusted under 35 U.S.C. 154(b) by 1648 days.

(21) Appl. No.: 10/958,671

(22) Filed: Oct. 4, 2004

(65) Prior Publication Data

US 2006/0072597 A1 Apr. 6, 2006

(51) Int. Cl.
*H04N 7/12* (2006.01)
*H04N 11/02* (2006.01)
*H04N 11/04* (2006.01)
*H04N 21/234* (2011.01)
*H04N 21/44* (2011.01)
*H04N 19/172* (2014.01)
*H04N 19/46* (2014.01)
*H04N 19/114* (2014.01)
*H04N 19/44* (2014.01)
*H04N 19/89* (2014.01)
*H04N 19/31* (2014.01)
*H04N 19/423* (2014.01)

(52) U.S. Cl.
CPC ....... *H04N 21/23406* (2013.01); *H04N 19/114* (2014.11); *H04N 19/172* (2014.11); *H04N 19/31* (2014.11); *H04N 19/423* (2014.11); *H04N 19/44* (2014.11); *H04N 19/46* (2014.11); *H04N 19/89* (2014.11); *H04N 21/44004* (2013.01)

(58) Field of Classification Search
CPC ... H04N 19/114; H04N 19/172; H04N 19/31; H04N 19/423; H04N 19/44
USPC ............. 375/240.01–240.06, 240.12–240.16, 375/240.25–240.26
See application file for complete search history.

(56) References Cited

U.S. PATENT DOCUMENTS

| | | |
|---|---|---|
| 5,122,875 A | 6/1992 | Raychaudhuri et al. |
| 5,313,186 A | 5/1994 | Schuhl et al. |
| 5,378,683 A | 1/1995 | Cabanel et al. |
| 5,387,941 A | 2/1995 | Montgomery et al. |
| 5,398,072 A | 3/1995 | Auld |

(Continued)

FOREIGN PATENT DOCUMENTS

| | | |
|---|---|---|
| CN | 1279856 | 1/2001 |
| CN | 1280743 | 1/2001 |

(Continued)

OTHER PUBLICATIONS

"RTP payload Format for H.264 Video" by S. Wenger et al draft-ietf-avt-rtp-h264-11.txt, Aug. 2004.

(Continued)

*Primary Examiner* — Nhon Diep
(74) *Attorney, Agent, or Firm* — Alston & Bird LLP

(57) ABSTRACT

A method for buffering media data in a buffer where the media data is included in data transmission units which have been ordered in a transmission order which is at least partly different from a decoding order of the media data in the data transmission units. The decoding order is indicated with a quantitative indicator for at least part of the transmission units. In the method a parameter is defined for a relation of the quantitative indicators of transmission units. The relation of transmission units in the buffer is checked against the parameter. The result of the checking is indicative of at least one transmission unit in the buffer preceding, in decoding order, any transmission unit in a sequence of transmission units not having been buffered in the buffer before the checking.

34 Claims, 8 Drawing Sheets

(56) References Cited

U.S. PATENT DOCUMENTS

| | | |
|---|---|---|
| 5,467,137 A | 11/1995 | Zdepski |
| 5,481,543 A | 1/1996 | Veltman |
| 5,481,643 A | 1/1996 | Ten Kate et al. |
| 5,486,864 A | 1/1996 | Zdepski |
| 5,517,250 A | 5/1996 | Hoogenboom et al. |
| 5,677,905 A | 10/1997 | Bigham et al. |
| 5,719,632 A | 2/1998 | Hoang et al. |
| 5,815,600 A | 9/1998 | Sano et al. |
| 5,822,024 A | 10/1998 | Setogawa et al. |
| 5,877,812 A | 3/1999 | Krause et al. |
| 5,892,924 A | 4/1999 | Lyon et al. |
| 6,011,590 A | 1/2000 | Saukkonen |
| 6,023,233 A | 2/2000 | Craven et al. |
| 6,141,785 A | 10/2000 | Hur et al. |
| 6,188,700 B1 | 2/2001 | Kato et al. |
| 6,191,581 B1 | 2/2001 | Van Dau et al. |
| 6,269,080 B1 | 7/2001 | Kumar |
| 6,289,129 B1 | 9/2001 | Chen et al. |
| 6,291,993 B1 | 9/2001 | Fert et al. |
| 6,493,388 B1 | 12/2002 | Wang |
| 6,496,004 B1 | 12/2002 | Nguyen Van Dau et al. |
| 6,496,980 B1 | 12/2002 | Tillman |
| 6,526,022 B1 | 2/2003 | Chiu et al. |
| 6,618,438 B1 | 9/2003 | Le Roux et al. |
| 6,625,320 B1 | 9/2003 | Nilsson et al. |
| 6,628,719 B1 * | 9/2003 | Kono et al. ............... 375/240.28 |
| 6,697,426 B1 | 2/2004 | Van Der Schaar et al. |
| 6,754,275 B1 * | 6/2004 | Yasuda et al. ............ 375/240.25 |
| 6,782,490 B2 | 8/2004 | Maxemchuk et al. |
| 6,873,786 B2 | 3/2005 | Lin et al. |
| 6,950,466 B2 * | 9/2005 | Kim et al. ................. 375/240.12 |
| 7,072,404 B2 * | 7/2006 | Itokawa .................... 375/240.28 |
| 7,289,500 B1 | 10/2007 | Amlekar |
| 7,296,205 B2 | 11/2007 | Curcio et al. |
| 7,301,944 B1 | 11/2007 | Redmond |
| 7,356,079 B2 * | 4/2008 | Laksono et al. ......... 375/240.03 |
| 7,495,867 B2 | 2/2009 | Sbiaa et al. |
| 7,526,523 B2 | 4/2009 | Nekovee et al. |
| 7,551,672 B1 | 6/2009 | Tahara et al. |
| 7,636,022 B2 * | 12/2009 | Shenoi ...................... 331/177 R |
| 7,809,240 B2 | 10/2010 | Nomura |
| 8,108,747 B2 | 1/2012 | Curcio et al. |
| 8,160,134 B2 | 4/2012 | Tahara et al. |
| 2001/0049291 A1 | 12/2001 | Sato et al. |
| 2002/0003799 A1 | 1/2002 | Tomita |
| 2002/0004840 A1 | 1/2002 | Harumoto et al. |
| 2002/0071485 A1 | 6/2002 | Caglar |
| 2002/0095636 A1 | 7/2002 | Tatsumi et al. |
| 2002/0105951 A1 | 8/2002 | Hannuksela et al. |
| 2002/0174442 A1 | 11/2002 | Nomura |
| 2003/0031175 A1 | 2/2003 | Hayashi et al. |
| 2003/0135784 A1 | 7/2003 | Yamaguchi et al. |
| 2003/0138043 A1 | 7/2003 | Hannuksela |
| 2003/0142689 A1 | 7/2003 | Haberman et al. |
| 2003/0169815 A1 | 9/2003 | Aggarwal et al. |
| 2004/0005007 A1 | 1/2004 | Viscito et al. |
| 2004/0010802 A1 | 1/2004 | Visharam et al. |
| 2004/0039796 A1 | 2/2004 | Watkins |
| 2004/0205071 A1 | 10/2004 | Uesugi et al. |
| 2004/0223551 A1 | 11/2004 | Hannuksela |
| 2004/0228413 A1 | 11/2004 | Hannuksela |
| 2005/0123055 A1 | 6/2005 | Winger |
| 2005/0135020 A1 | 6/2005 | Sugita et al. |
| 2005/0201471 A1 | 9/2005 | Hannuksela et al. |
| 2007/0002503 A1 | 1/2007 | Sbiaa et al. |
| 2007/0030603 A1 | 2/2007 | Sato et al. |
| 2007/0035888 A1 | 2/2007 | Sbiaa et al. |
| 2007/0086120 A1 | 4/2007 | Shimazawa et al. |
| 2007/0159164 A1 | 7/2007 | Hehn et al. |
| 2009/0122658 A1 | 5/2009 | Gaudin et al. |
| 2009/0128965 A1 | 5/2009 | Mizuno et al. |
| 2011/0019747 A1 | 1/2011 | Hannuksela |

FOREIGN PATENT DOCUMENTS

| | | |
|---|---|---|
| CN | 1280743 A | 1/2001 |
| CN | 1280753 A | 1/2001 |
| CN | 1358388 | 7/2002 |
| EP | 0944269 | 9/1999 |
| EP | 0949819 | 10/1999 |
| EP | 0949819 A1 | 10/1999 |
| EP | 0981249 | 2/2000 |
| EP | 1069777 A1 | 1/2001 |
| EP | 1146683 | 4/2001 |
| EP | 1185033 | 3/2002 |
| EP | 1379085 | 1/2004 |
| EP | 1379085 A1 | 1/2004 |
| FR | 2852399 A1 | 9/2004 |
| GB | 2287383 | 3/1994 |
| JP | 2001045020 | 2/2001 |
| JP | 2001298407 | 10/2001 |
| JP | 2002112265 | 4/2002 |
| JP | 2002330379 | 11/2002 |
| JP | 2002-359641 | 12/2002 |
| JP | 2003008642 | 1/2003 |
| RU | 2115261 C1 | 7/1998 |
| RU | 2189072 | 6/2000 |
| WO | 96/20575 | 7/1996 |
| WO | 9728505 | 8/1997 |
| WO | WO-9801764 A1 | 1/1998 |
| WO | 9916225 | 4/1999 |
| WO | WO-9927379 A1 | 6/1999 |
| WO | WO-0036429 A1 | 6/2000 |
| WO | WO-00/46995 | 10/2000 |
| WO | WO-00/67469 A1 | 11/2000 |
| WO | 2004019530 | 3/2004 |
| WO | 2004075555 | 9/2004 |
| WO | WO-2004083881 A1 | 9/2004 |

OTHER PUBLICATIONS van der Meer, J.. et al.; Philips Electronics: "draft-ietf-avt-mpeg4-simple-07.txt", Feb. 1, 2003, XP008139886 (41 pages).

Wenger et al., "RTP payload format for H.264 Video, draft-ietf-avt-rtp-h.264-02.txt", IETF Standard Working-draft, Internet Engineering Task Force, IETF, CH, vol. Avt, No. 2; Jun. 2003 (52 pages).

Hannuksela, M.; "Signaling of Enhanced GOPs"; ITU Study Group 16—Video Coding Experts Group—ISO/IEC MPEG & ITU-T VCEG(ISO/IEC JTC1/SC29/WG11 and ITU-T GG16 Q6); No. JVT-DO98; Jul. 26, 2002 (9 pages).

Hannuksela, M.; "On NAL Unit Order", ITU Study Group 16 0 Video Coding Experts Group—ISO/IEC MPEG & ITU-T VCEG(IDO/IEC JTC1/SC29/WG11 and ITU-T SG16 Q6); No. JVT-DO93; Jul. 26, 2002 (7 pages).

Sullivan, G.; Q.6/16 Report of Activities at Interim Meetings in Klagenfurt, ITU-T Draft Study Period 2001-2004, International Telecommunication Union, Geneva; CH, vol. Study Group 16; Austria, May 6-10, 2002 (76 pages).

Joint Video Team (JVT) of ISO/IEC MPEG and ITU-T VCEG; "Study of Final Committee of Draft of Joint Video Specification, JVT-F100;" 6th Meeting: Awaji Island, JP, Dec. 5-13, 2002 (10 pages).

Wenger, S. et al.; "RTP payload Format for JVT Video"; Internet Draft draft-ietf-avt-rtp-h.264-01.txt; Mar. 1, 2003 (expires Aug. 2003) (14 pages).

Wenger, S. et al.; "RTP payload Format for H.264 Video"; Internet Draft draft-ietf-avt-rtp-h.264-04.txt; Feb. 2004 (expires Aug. 2004) (30 pages).

Journal of Software, vol. 12, No. 8; W. Wang et al.; "An Index Model for MPEG-2 Streams and Its Application;" pp. 1212-1219, Dec. 2001; with English abstract on p. 8 (8 pages).

"HRD Editor's Input to Final Committee Draft (FCD) of Joint Video Specification (ITU-T Rec. H.264|ISO/IEC 14496-10 AVC) regarding Hypothetical Reference Decoder," Joint Video Team (JVT) of ISO/IEC MPEG and ITU-T VCEG, DRAFT ISO/IEC 14496-10: 2002(E), Document JVT-D146, file: JVT-D146.doc, Generated: Jul. 25, 2002, Showing changes made, 4th Meeting, Klagenfurt, Austria, Jul. 22-26, 2002 (20 pages).

(56) References Cited

OTHER PUBLICATIONS

"HRD Editor's Input to Final Committee Draft (FCD) of Joint Video Specification (ITU-T Rec. H.264|ISO/IEC 14496-10 AVC) regarding Hypothetical Reference Decoder," Joint Video Team (JVT) of ISO/IEC MPEG and ITU-T VCEG, DRAFT ISO/IEC 14496-10: 2002(E), Document JVT-D146, file: JVT-D146.doc, Generated: Jul. 25, 2002, Showing changes accepted, 4th Meeting, Klagenfurt, Austria, Jul. 22-26, 2002 (20 pages).
English Abstract of Russian Patent Publication No. RU2115261 (See US Pat. No. 5,467,173), Device for Generation of Packed Video Signal (Variants), published Jul. 10, 1998 (1 page).
Swedish Patent Office; Henrik Andersson; "International Search Report (3 pages) and Written Opinion (5 pages)," PCT Application No. PCT/FI2004/050016, corresponding to U.S. Appl. No. 10/782,399, whole document; Jun. 14, 2004 (8 pages total).
Patent Office of the People's Republic of China; Li Ping, "First Office Action," Chinese Application No. 20048000447.0, corresponding to U.S. Appl. No. 10/782,399, filed Mar. 7, 2008, English translation only (7 pages).
Mexican Patent Office; "Official Action;" Mexican Application No. PA/A/2005/008405, corresponding to U.S. Appl. No. 10/782,399, whole document, May 28, 2008 (4 pages), with partial English translation (3 pages).
Swedish Patent Office; Jesper Bergstrand; "International Search Report;" International Application No. PCT/FI2005/050032, corresponding to U.S. Appl. Nos. 11/057,065 (60/544,598), whole document, Jun. 8, 2005 (3 pages).
Intellectual Property Office of Singapore; Authorized Officer Steffen Skanning; "Written Opinion;", Singapore Application No. SG-2006-05400-1, corresponding to U.S. Appl. No. 10/057065, whole document; Jul. 30, 2008 (9 pages).
Japanese Patent Office; Masaru Kawasaki; "Notice of Reasons for Rejection;" Japanese Application No. 2006-552649, corresponding to U.S. Appl. No. 11/057,065 (60/598), whole document (1 page); Nov. 24, 2009; with English translation (2 pages).
Federal Service for Intellectual Property, Patents and Trademarks (Russian Patent Office); "Decision to Grant a Patent for an Invention;" Oct. 1, 2009, Russian Application No. 2006128854/09I corresponding to U.S. Appl. Nos. 10/782,399, (60/483,159 and 60/448,693) whole document (11 pages In Russian, with 7 pages English translation (18 pages total)).
Canadian Office Action, Canadian Application No. 2,515,354, corresponding to U.S. Appl. Nos. 10/782,399 (60/448,693 and 60/483,159), dated Jul. 15, 2009 (5 pages).
Chinese office Action (English Translation) dated Mar. 7, 2008 in Chinese Patent Application No. 200480004552.4, corresponding to U.S. Appl. Nos. 10/782,399 (60/448,693 and 60/483,159) (11 pages).
"Asynchronous layer Coding (ALC) Ptotocol Instantiation," RFC 3450, Luby et al., Dec. 2002 (9 pages).
"NACK-Oriented Reliable Multicast Protocol (norm)," Adamson et al; Internet Draft, Jan. 2004 (18 pages).
"Forward Error Correction (FEC) Building Block," RFC 3452, Luby et al., Dec. 2002 (5 pages).
"FLUTE—File Delivery over Uniirectional Transport," Paila et al., Internet Draft, Dec. 2003 (8 pages).
3GPP TS 23.246, V.6.1.0, Dec. 2003, Release 6, Section 7.1, Technical Specification Group Services and System Aspects; multimedia Broadcast/Miltcast Service (MBMS); Architecture and Functional Description (11 pages).
International Search Report/Written Opinion of the ISA, mailed May 25, 2005 in International Application No. PCT/FI2005/050033, corresponding to U.S. Appl. No. 10/782,371 (11 pages).
English language machine translation of Japanese Patent Publication No. 2001-045020 (9 pages) including 1 page English Abstract, Feb. 16, 2001.
Japanese Office Action dated Oct. 23, 2009 in Japanese Application No. 2006-552650, corresponding to U.S. Appl. No. 11/982,052, (17 pages including pp. 1-11 English translation and pp. 12-17 original document).
English language machine translation of Japanese Patent Publication No. 2003-008642 (21 pages) including 1 page English Abstract, Jan. 10, 2003.
Singapore Search Report mailed Jun. 25, 2008 in Singapore Application No. SG-2006-05400-1, corresponding to U.S. Appl. No. 11/057,065 (9 pages).
International Search Report mailed Jun. 8, 2005 in International Application No. PCT/FI2005/050032, corresponding to U.S. Appl. No. 11/057,065 (4 pages).
International Search Report mailed Jun. 21, 2004 in International Application No. PCT/FI2004/50015, corresponding to U.S. Appl. No. 10/782,372 (2 pages).
Japanese Office Action for Application No. 2009-141863, dated Oct. 10, 2012.
"Information Technology Vocabulary. Fundamental Terms," ISO/IEC 2382-1:1993, <www.mprepc.ru/informatisation/iso2381-1.html>, Feb. 15, 1994.
3GPP TS 23.246, V.6.1.0 (Dec. 2003), Technical Specification, 3rd Generation Partnership Project; Technical Specification Group Services and System Aspects; Multimedia Broadcast/Multicast Service (MBMS); Architecture and Functional Description (Release 6), 38 pages.
Hannuksela, Miska M., "Levels and HRD," ITU Study Group 16—Video Coding Experts Group—ISO/IEC MPEG & ITU-T VCEG (ISO/IEC JTC1/SC29/WG11 and ITU-T SG16 Q6), JVT-0069, May 10, 2002.
Notice of Allowance from Russian Appl. No. 2005129107/09(032663), dated Jun. 5, 2009.
Office Action from EP Appl. No. 04711623.1, dated Mar. 7, 2012.
Office Action from EP Appl. No. 04711624.9 dated Mar. 9, 2011.
Office Action from EP Appl. No. 04711624.9, dated Nov. 10, 2011.
Office Action from EP Appl. No. 05708200.0 dated Mar. 23, 2011.
Office Action from Japanese Appl. No. 2009-141863, dated Aug. 16, 2011.
Office Action from Mexican Appl. No. PA/a/2005/008404, dated May 9, 2008.
Office Action from Taiwanese Appl. No. 094104145, dated Sep. 26, 2011.
Stockhammer et al., "H.264/AVC in Wireless Environments," *IEEE Transactions on Circuits and Systems for Video Technology*, vol. 13, No. 7, Jul. 2003, pp. 657-673.
Stockhammer et al., "H.264/JVT Coding Network Abstraction Layer and IP-Based Transport," *Proceedings of the IEEE 2002 International Conference on Image Processing*, Sep. 22-25, 2002, vol. 2, pp. II-485-II-488.
Wang et al., "System and Transport Interface of SVC," *IEEE Transactions on Circuits and Systems for Video Technology*, vol. 17, No. 9, Sep. 2007, pp. 1149-1163.
Wenger et al., "RTP Payload Format for H.264 Video," Internet Draft draft-ietf-avt-rtp-h264-03.txt, IETF Standard-Working-Draft, Internet Engineering Task Force, IETF, CH, vol. Avt, No. 3, Oct. 2003.
Wenger et al., "RTP Payload Format for H.264 Video; draft-ietf-avt-rtp-h264-02.txt," IETF Standard-Working-Draft, Internet Engineering Task Force, IETF, CH; vol. Avt, No. 2, Jun. 26, 2003.
Wenger et al., "RTP Payload Format for JVT Video," Internet Draft draft-ietf-avt-rtp-h264-00.txt, Sep. 21, 2002, 16 pages.
Office Action for U.S. Appl. No. 10/782,372 dated Jul. 18, 2012.
Canadian Office Action mailed Aug. 20, 2010 Canadian Patent Application No. 2,556,120 which is a parallel application to co-pending U.S. Appl. No. 10/782,399 (5 pages).
Westerlund, M.; "Re: [AVT] 1-0ACTION:draft-ietf-avtrtph264-01.txt;" dated Mar. 7, 2003; XP055084330; Retrieved on Oct. 17, 2013 from <URL:https://www.ietf.org/mail-archive/web/avtlcurrenti msg02205.html>.
European communication for Application No. 04711624 9, dated Oct. 24, 2013.
English Abstract of Japanese Publication No. JP2003-008642, Sony Corp., published Jan. 10, 2003 (1 page).
Canadian Office Action mailed Jul. 15, 2010 in Canadian Patent Application No. 2,5555,282 which is a parallel application to U.S. Appl. No. 10/782,371 which issued as US Patent No. 7,296,205 which corresponds to this application (4 pages).

\* cited by examiner

PICTURE BUFFERING METHOD

FIELD OF THE INVENTION

The present invention relates to a method for buffering media data. The invention also relates to a system, transmitting device, receiving device, an encoder, a decoder, an electronic device, a computer product, and a signal.

BACKGROUND OF THE INVENTION

Published video coding standards include ITU-T H.261, ITU-T H.263, ISO/IEC MPEG-1, ISO/IEC MPEG-2, and ISO/IEC MPEG-4 Part 2. These standards are herein referred to as conventional video coding standards.
Video Communication Systems Video communication systems can be divided into conversational and non-conversational systems. Conversational systems include video conferencing and video telephony. Examples of such systems include ITU-T Recommendations H.320, H.323, and H.324 that specify a video conferencing/telephony system operating in ISDN, IP, and PSTN networks respectively. Conversational systems are characterized by the intent to minimize the end-to-end delay (from audio-video capture to the far-end audio-video presentation) in order to improve the user experience.

Non-conversational systems include playback of stored content, such as Digital Versatile Disks (DVDs) or video files stored in a mass memory of a playback device, digital TV, and streaming. A short review of the most important standards in these technology areas is given below.

A dominant standard in digital video consumer electronics today is MPEG-2, which includes specifications for video compression, audio compression, storage, and transport. The storage and transport of coded video is based on the concept of an elementary stream. An elementary stream consists of coded data from a single source (e.g. video) plus ancillary data needed for synchronization, identification and characterization of the source information. An elementary stream is packetized into either constant-length or variable-length packets to form a Packetized Elementary Stream (PES). Each PES packet consists of a header followed by stream data called the payload. PES packets from various elementary streams are combined to form either a Program Stream (PS) or a Transport Stream (TS). PS is aimed at applications having negligible transmission errors, such as store-and-play type of applications. TS is aimed at applications that are susceptible of transmission errors. However, TS assumes that the network throughput is guaranteed to be constant.

The Joint Video Team (JVT) of ITU-T and ISO/IEC has prepared a standard published as ITU-T Recommendation H.264 and ISO/IEC International Standard 14496-10 (MPEG-4 Part 10). The standard is referred to as the JVT coding standard in this paper, and the codec according to the draft standard is referred to as the JVT codec.

The codec specification itself distinguishes conceptually between a video coding layer (VCL), and a network abstraction layer (NAL). The VCL contains the signal processing functionality of the codec, things such as transform, quantization, motion search/compensation, and the loop filter. It follows the general concept of most of today's video codecs, a macroblock-based coder that utilizes inter picture prediction with motion compensation, and transform coding of the residual signal. The output of the VCL are slices: a bit string that contains the macroblock data of an integer number of macroblocks, and the information of the slice header (containing the spatial address of the first macroblock in the slice, the initial quantization parameter, and similar). Macroblocks in slices are ordered in scan order unless a different macroblock allocation is specified, using the so-called Flexible Macroblock Ordering syntax. In-picture prediction is used only within a slice.

The NAL encapsulates the slice output of the VCL into Network Abstraction Layer Units (NAL units or NALUs), which are suitable for the transmission over packet networks or the use in packet oriented multiplex environments. JVT's Annex B defines an encapsulation process to transmit such NALUs over byte-stream oriented networks.

The optional reference picture selection mode of H.263 and the NEWPRED coding tool of MPEG-4 Part 2 enable selection of the reference frame for motion compensation per each picture segment, e.g., per each slice in H.263. Furthermore, the optional Enhanced Reference Picture Selection mode of H.263 and the JVT coding standard enable selection of the reference frame for each macroblock separately.

Reference picture selection enables many types of temporal scalability schemes. FIG. 1 shows an example of a temporal scalability scheme, which is herein referred to as recursive temporal scalability. The example scheme can be decoded with three constant frame rates. FIG. 2 depicts a scheme referred to as Video Redundancy Coding, where a sequence of pictures is divided into two or more independently coded threads in an interleaved manner. The arrows in these and all the subsequent figures indicate the direction of motion compensation and the values under the frames correspond to the relative capturing and displaying times of the frames.
Transmission Order In conventional video coding standards, the decoding order of pictures is the same as the display order except for B pictures. A block in a conventional B picture can be bi-directionally temporally predicted from two reference pictures, where one reference picture is temporally preceding and the other reference picture is temporally succeeding in display order. Only the latest reference picture in decoding order can succeed the B picture in display order (exception: interlaced coding in H.263 where both field pictures of a temporally subsequent reference frame can precede a B picture in decoding order). A conventional B picture cannot be used as a reference picture for temporal prediction, and therefore a conventional B picture can be disposed of without affecting the decoding of any other pictures.

The JVT coding standard includes the following novel technical features compared to earlier standards:
  The decoding order of pictures is decoupled from the display order. The picture number indicates decoding order and the picture order count indicates the display order.
  Reference pictures for a block in a B picture can either be before or after the B picture in display order. Consequently, a B picture stands for a bi-predictive picture instead of a bi-directional picture.
  Pictures that are not used as reference pictures are marked explicitly. A picture of any type (intra, inter, B, etc.) can either be a reference picture or a non-reference picture. (Thus, a B picture can be used as a reference picture for temporal prediction of other pictures.)
  A picture can contain slices that are coded with a different coding type. In other words, a coded picture may consist of an intra-coded slice and a B-coded slice, for example.

Decoupling of display order from decoding order can be beneficial from compression efficiency and error resiliency point of view.

An example of a prediction structure potentially improving compression efficiency is presented in FIG. 3. Boxes indicate pictures, capital letters within boxes indicate coding types, numbers within boxes are picture numbers according to the JVT coding standard, and arrows indicate prediction dependencies. Note that picture B17 is a reference picture for pictures B18. Compression efficiency is potentially improved compared to conventional coding, because the reference pictures for pictures B18 are temporally closer compared to conventional coding with PBBP or PBBBP coded picture patterns. Compression efficiency is potentially improved compared to conventional PBP coded picture pattern, because part of reference pictures are bi-directionally predicted.

FIG. 4 presents an example of the intra picture postponement method that can be used to improve error resiliency. Conventionally, an intra picture is coded immediately after a scene cut or as a response to an expired intra picture refresh period, for example. In the intra picture postponement method, an intra picture is not coded immediately after a need to code an intra picture arises, but rather a temporally subsequent picture is selected as an intra picture. Each picture between the coded intra picture and the conventional location of an intra picture is predicted from the next temporally subsequent picture. As FIG. 4 shows, the intra picture postponement method generates two independent inter picture prediction chains, whereas conventional coding algorithms produce a single inter picture chain. It is intuitively clear that the two-chain approach is more robust against erasure errors than the one-chain conventional approach. If one chain suffers from a packet loss, the other chain may still be correctly received. In conventional coding, a packet loss always causes error propagation to the rest of the inter picture prediction chain.

Two types of ordering and timing information have been conventionally associated with digital video: decoding and presentation order. A closer look at the related technology is taken below.

A decoding timestamp (DTS) indicates the time relative to a reference clock that a coded data unit is supposed to be decoded. If DTS is coded and transmitted, it serves for two purposes: First, if the decoding order of pictures differs from their output order, DTS indicates the decoding order explicitly. Second, DTS guarantees a certain pre-decoder buffering behavior provided that the reception rate is close to the transmission rate at any moment. In networks where the end-to-end latency varies, the second use of DTS plays little or no role. Instead, received data is decoded as fast as possible provided that there is room in the post-decoder buffer for uncompressed pictures.

Carriage of DTS depends on the communication system and video coding standard in use. In MPEG-2 Systems, DTS can optionally be transmitted as one item in the header of a PES packet. In the JVT coding standard, DTS can optionally be carried as a part of Supplemental Enhancement Information (SEI), and it is used in the operation of an optional Hypothetical Reference Decoder. In ISO Base Media File Format, DTS is dedicated its own box type, Decoding Time to Sample Box. In many systems, such as RTP-based streaming systems, DTS is not carried at all, because decoding order is assumed to be the same as transmission order and exact decoding time does not play an important role.

H.263 optional Annex U and Annex W.6.12 specify a picture number that is incremented by 1 relative to the previous reference picture in decoding order. In the JVT coding standard, the frame number coding element is specified similarly to the picture number of H.263. The JVT coding standard specifies a particular type of an intra picture, called an instantaneous decoder refresh (IDR) picture. No subsequent picture can refer to pictures that are earlier than the IDR picture in decoding order. An IDR picture is often coded as a response to a scene change. In the JVT coding standard, frame number is reset to 0 at an IDR picture.

H.263 picture number can be used to recover the decoding order of reference pictures. Similarly, the JVT frame number can be used to recover the decoding order of frames between an IDR picture (inclusive) and the next IDR picture (exclusive) in decoding order. However, because the complementary reference field pairs (consecutive pictures coded as fields that are of different parity) share the same frame number, their decoding order cannot be reconstructed from the frame numbers.

The H.263 picture number or JVT frame number of a non-reference picture is specified to be equal to the picture or frame number of the previous reference picture in decoding order plus 1. If several non-reference pictures are consecutive in decoding order, they share the same picture or frame number. The picture or frame number of a non-reference picture is also the same as the picture or frame number of the following reference picture in decoding order. The decoding order of consecutive non-reference pictures can be recovered using the Temporal Reference (TR) coding element in H.263 or the Picture Order Count (POC) concept of the JVT coding standard.

The draft RTP payload of the JVT codec (S. Wenger, et. al, "RTP Payload Format for H.264 Video," draft-ieff-avt-rtp-h264-11.txt, August 2004) specifies three packetization modes: single NAL unit mode, non-interleaved mode, and interleaved mode. In the single NAL unit and non-interleaved modes, the decoding order of NAL units is identical to their transmission order. In the interleaved packetization mode, the transmission order of NAL units is allowed to differ from the decoding order of the NAL units. Decoding order number (DON) is a field in the payload structure or a derived variable that indicates the NAL unit decoding order. The DON value of the first NAL unit in transmission order may be set to any value. Values of DON are in the range of 0 to 65535, inclusive. After reaching the maximum value, the value of DON wraps around to 0. The decoding order of two NAL units in the interleaved packetization mode is determined as follows. Let DON(i) be the decoding order number of the NAL unit having index i in the transmission order. Function don_diff(m,n) is specified as follows:

If DON($m$)==DON($n$), don_diff($m,n$)=0

If (DON($m$)<DON($n$) and DON($n$)−DON($m$)<32768), don_diff($m,n$)=DON($n$)−DON($m$)

If (DON($m$)>DON($n$) and DON($m$)−DON($n$)>=32768), don_diff($m,n$)=65536−DON($m$)+DON($n$)

If (DON($m$)<DON($n$) and DON($n$)−DON($m$)>=32768), don_diff($m,n$)=−(DON($m$)+65536−DON($n$))

If (DON($m$)>DON($n$) and DON($m$)−DON($n$)<32768), don_diff($m,n$)=−(DON($m$)−DON($n$))

A positive value of don_diff(m,n) indicates that the NAL unit having transmission order index n follows, in decoding order, the NAL unit having transmission order index m. When don_diff(m,n) is equal to 0, then the NAL unit decoding order of the two NAL units can be in either order. For example, when arbitrary slice order is allowed by the video coding profile in use, all the coded slice NAL units of a coded picture are allowed to have the same value of DON. A negative value of don_diff(m,n) indicates that the NAL unit having transmission order index n precedes, in decoding order, the NAL unit having transmission order index m.

A presentation timestamp (PTS) indicates the time relative to a reference clock when a picture is supposed to be displayed. A presentation timestamp is also called a display timestamp, output timestamp, and composition timestamp.

Carriage of PTS depends on the communication system and video coding standard in use. In MPEG-2 Systems, PTS can optionally be transmitted as one item in the header of a PES packet. In the JVT coding standard, PTS can optionally be carried as a part of Supplemental Enhancement Information (SEI). In ISO Base Media File Format, PTS is dedicated its own box type, Composition Time to Sample Box where the presentation timestamp is coded relative to the corresponding decoding timestamp. In RTP, the RTP timestamp in the RTP packet header corresponds to PTS.

Many of the conventional video coding standards feature the Temporal Reference (TR) coding element that is similar to PTS in many aspects. In some of the conventional coding standards, such as MPEG-2 video, TR is reset to zero at the beginning of a Group of Pictures (GOP). In the JVT coding standard, there is no concept of time in the video coding layer. The Picture Order Count (POC) is specified for each frame and field and it is used similarly to TR in direct temporal prediction of B slices, for example. POC is reset to 0 at an IDR picture.

Buffering

Streaming clients typically have a receiver buffer that is capable of storing a relatively large amount of data. Initially, when a streaming session is established, a client does not start playing the stream back immediately, but rather it typically buffers the incoming data for a few seconds. This buffering helps to maintain continuous playback, because, in case of occasional increased transmission delays or network throughput drops, the client can decode and play buffered data. Otherwise, without initial buffering, the client has to freeze the display, stop decoding, and wait for incoming data. The buffering is also necessary for either automatic or selective retransmission in any protocol level. If any part of a picture is lost, a retransmission mechanism may be used to resend the lost data. If the retransmitted data is received before its scheduled decoding or playback time, the loss is perfectly recovered.

Coded pictures can be ranked according to their importance in the subjective quality of the decoded sequence. For example, non-reference pictures, such as conventional B pictures, are subjectively least important, because their absence does not affect decoding of any other pictures. Subjective ranking can also be made on data partition or slice group basis. Coded slices and data partitions that are subjectively the most important can be sent earlier than their decoding order indicates, whereas coded slices and data partitions that are subjectively the least important can be sent later than their natural coding order indicates. Consequently, any retransmitted parts of the most important slice and data partitions are more likely to be received before their scheduled decoding or playback time compared to the least important slices and data partitions.

Pre-Decoder Buffering

Pre-decoder buffering refers to buffering of coded data before it is decoded. Initial buffering refers to pre-decoder buffering at the beginning of a streaming session. Initial buffering is conventionally done for two reasons explained below.

In conversational packet-switched multimedia systems, e.g., in IP-based video conferencing systems, different types of media are normally carried in separate packets. Moreover, packets are typically carried on top of a best-effort network that cannot guarantee a constant transmission delay, but rather the delay may vary from packet to packet. Consequently, packets having the same presentation (playback) time-stamp may not be received at the same time, and the reception interval of two packets may not be the same as their presentation interval (in terms of time). Thus, in order to maintain playback synchronization between different media types and to maintain the correct playback rate, a multimedia terminal typically buffers received data for a short period (e.g. less than half a second) in order to smooth out delay variation. Herein, this type of a buffer component is referred as a delay jitter buffer. Buffering can take place before and/or after media data decoding.

Delay jitter buffering is also applied in streaming systems. Due to the fact that streaming is a non-conversational application, the delay jitter buffer required may be considerably larger than in conversational applications. When a streaming player has established a connection to a server and requested a multimedia stream to be downloaded, the server begins to transmit the desired stream. The player does not start playing the stream back immediately, but rather it typically buffers the incoming data for a certain period, typically a few seconds. Herein, this buffering is referred to as initial buffering. Initial buffering provides the ability to smooth out transmission delay variations in a manner similar to that provided by delay jitter buffering in conversational applications. In addition, it may enable the use of link, transport, and/or application layer retransmissions of lost protocol data units (PDUs). The player can decode and play buffered data while retransmitted PDUs may be received in time to be decoded and played back at the scheduled moment.

Initial buffering in streaming clients provides yet another advantage that cannot be achieved in conversational systems: it allows the data rate of the media transmitted from the server to vary. In other words, media packets can be temporarily transmitted faster or slower than their playback rate as long as the receiver buffer does not overflow or underflow. The fluctuation in the data rate may originate from two sources.

First, the compression efficiency achievable in some media types, such as video, still images, audio and text, depends on the contents of the source data. Consequently, if a stable quality is desired, the bit-rate of the resulting compressed bit-stream varies. Typically, a stable audio-visual quality is subjectively more pleasing than a varying quality. Thus, initial buffering enables a more pleasing audio-visual quality to be achieved compared with a system without initial buffering, such as a video conferencing system.

Second, it is commonly known that packet losses in fixed IP networks occur in bursts. In order to avoid bursty errors and high peak bit- and packet-rates, well-designed streaming servers schedule the transmission of packets carefully. Packets may not be sent precisely at the rate they are played back at the receiving end, but rather the servers may try to achieve a steady interval between transmitted packets. A server may also adjust the rate of packet transmission in accordance with prevailing network conditions, reducing the packet transmission rate when the network becomes congested and increasing it if network conditions allow, for example.

Yet another advantage of pre-decoder buffering is that it enables arranging of transmission units from the reception order to decoding order. The reception order is identical to the transmission order provided that no re-order of transmission units happened in the transmission path.

Transmission of Multimedia Streams

A multimedia streaming system consists of a streaming server and a number of players, which access the server via a network. The network is typically packet-oriented and provides little or no means to guaranteed quality of service. The players fetch either pre-stored or live multimedia content from the server and play it back in real-time while the content is being downloaded. The type of communication can be either point-to-point or multicast. In point-to-point streaming, the server provides a separate connection for each player. In multicast streaming, the server transmits a single data stream to a number of players, and network elements duplicate the stream only if it is necessary.

When a player has established a connection to a server and requested for a multimedia stream, the server begins to transmit the desired stream. The player does not start playing the stream back immediately, but rather it typically buffers the incoming data for a few seconds. Herein, this buffering is referred to as initial buffering. Initial buffering helps to maintain pauseless playback, because, in case of occasional increased transmission delays or network throughput drops, the player can decode and play buffered data.

In order to avoid unlimited transmission delay, it is uncommon to favor reliable transport protocols in streaming systems. Instead, the systems prefer unreliable transport protocols, such as UDP, which, on one hand, inherit a more stable transmission delay, but, on the other hand, also suffer from data corruption or loss.

RTP and RTCP protocols can be used on top of UDP to control real-time communications. RTP provides means to detect losses of transmission packets, to reassemble the correct transmission order of packets in the receiving end, and to associate a sampling time-stamp with each packet. Among other things RTCP conveys information about how large a portion of packets were correctly received, and, therefore, it can be used for flow control purposes.

In conventional video coding standards, the decoding order is coupled with the output order. In other words, the decoding order of I and P pictures is the same as their output order, and the decoding order of a B picture immediately follows the decoding order of the latter reference picture of the B picture in output order. Consequently, it is possible to recover the decoding order based on known output order. The output order is typically conveyed in the elementary video bitstream in the Temporal Reference (TR) field and also in the system multiplex layer, such as in the RTP header.

Some RTP payload specifications allow transmission of coded data out of decoding order. The amount of disorder is typically characterized by one value that is defined similarly in many relevant specifications. For example, in the draft RTP Payload Format for Transport of MPEG-4 Elementary Streams, the maxDisplacement parameter is specified as follows:

The maximum displacement in time of an access unit (AU, corresponding to a coded picture) is the maximum difference between the time stamp of an AU in the pattern and the time stamp of the earliest AU that is not yet present. In other words, when considering a sequence of interleaved AUs, then:

Maximum displacement=max{TS(*i*)−TS(*j*)}, for any *i* and any *j*>*i*, where i and j indicate the index of the AU in the interleaving pattern and TS denotes the time stamp of the AU It has been noticed in the present invention that in this method there are some problems:

RTP timestamp indicates the capture/display timestamp. The JVT coding standard allows decoding order different from output order. The receiver buffer is used to reorder packets from transmission/reception order to decoding order. Thus, displacement specified between differences in RTP timestamps cannot be used to arrange transmission units from transmission order to decoding order.

The U.S. patent application 60/483,159 describes buffering operation based on parameter sprop-interleaving-depth, which specifies the maximum number of VCL NAL units that precede any VCL NAL unit in the NAL unit stream in transmission order and follow the VCL NAL unit in decoding order. Constant N is the value of the sprop-interleaving-depth parameter incremented by 1. If the parameter is not present, a 0 value number could be implied. The receiver buffering operates as follows.

When the video stream transfer session is initialized, the receiver allocates memory for the receiving buffer for storing at least N pieces of VCL NAL units. The receiver then starts to receive the video stream and stores the received VCL NAL units into the receiving buffer, until at least N pieces of VCL NAL units are stored into the receiving buffer.

When the receiver buffer contains at least N VCL NAL units, NAL units are removed from the receiver buffer one by one and passed to the decoder. The NAL units are not necessarily removed from the receiver buffer in the same order in which they were stored, but according to the decoding order number (DON) of the NAL units, as described below. The delivery of the packets to the decoder is continued until the buffer contains less than N VCL NAL units, i.e. N−1 VCL NAL units.

It has been noticed that the buffering operation in the U.S. patent application 60/483,159 has some problems. For example, if there are transmission losses the decoder may not receive all the transmitted transmission units. Therefore, the decoding buffer is filled more slowly in the decoder than in a situation in which all transmission units are received. Thus, the pictures may be output from the decoder buffer slower than what is optimal for the decoder. Another problem may arise when consecutive decoding order numbers in transmission order do not follow a constant pattern. In other words, if the difference of decoding order numbers of two successively decodable transmission units changes from time to time then sprop-interleaving-depth is selected according the largest number of VCL NAL units in the receiver buffer that must be present in order to arrange NAL units correctly in decoding order and therefore buffering for an individual NAL unit may last longer than necessary to output it from the receiver buffer in correct decoding order.

SUMMARY OF THE INVENTION

According to a first aspect of the present invention there is provided a method for buffering media data in a buffer,
the media data being included in data transmission units,
the data transmission units having been ordered in a transmission order which is at least partly different from a decoding order of the media data in the data transmission units,
the decoding order having been indicated with a quantitative indicator for at least part of the transmission units,
wherein the method comprises:
defining a parameter for a relation of the quantitative indicators of transmission units;
checking the relation of transmission units in the buffer against the parameter, the result of the checking being indicative of at least one transmission unit in the buffer preceding, in decoding order, any transmission unit in a sequence of transmission units not having been buffered in the buffer before the checking.

According to a second aspect of the present invention there is provided a method for buffering media data in a buffer, the media data being included in data transmission units,
the data transmission units having been ordered in a transmission order which is at least partly different from a decoding order of the media data in the data transmission units,
the decoding order having been indicated with a quantitative indicator for at least part of the transmission units,
wherein the method comprises:
defining a parameter for a relation of the quantitative indicators of transmission units;
checking the relation of transmission units in the buffer against the parameter, the result of the checking being indicative of whether at least one of the transmission units in the buffer can be output.

According to a third aspect of the present invention there is provided a method for transmitting media data comprising
including the media data in data transmission units;
ordering the data transmission units in a transmission order which is at least partly different from a decoding order of the media data in the data transmission units;
indicating the decoding order with a quantitative indicator for at least part of the transmission units;
defining a parameter for a relation of the quantitative indicators of transmission units;
transmitting transmission units to a receiver;
receiving transmission units in the receiver;
buffering the received transmission units in a buffer,
checking the relation of transmission units in the buffer against the parameter;
the result of the checking being indicative of at least one transmission unit in the buffer preceding, in decoding order, any transmission unit in a sequence of transmission units not having been buffered in the buffer before the checking.

According to a fourth aspect of the present invention there is provided a decoder for decoding media data,
the media data being included in data transmission units,
the data transmission units having been ordered in a transmission order which is at least partly different from a decoding order of the media data in the data transmission units; and
the decoding order having been indicated with a quantitative indicator for at least part of the transmission units;
the decoder comprising:
an input for receiving transmission units;
a buffer for buffering transmission units;
a verifier for checking the relation of two transmission units in the buffer against a parameter defined for a relation of the quantitative indicators of two transmission units, and for providing a result of the checking being indicative of whether at least one of the transmission units in the buffer can be output.

According to a fifth aspect of the present invention there is provided a module for buffering media data,
the media data being included in data transmission units,
the data transmission units having been ordered in a transmission order which is at least partly different from a decoding order of the media data in the data transmission units; and
the decoding order having been indicated with a quantitative indicator for at least part of the transmission units;
the module comprising:
an input for receiving transmission units;
a verifier for checking the relation of two transmission units in a buffer against a parameter defined for a relation of the quantitative indicators of two transmission units, and for providing a result of the checking being indicative of whether at least one of the transmission units in the buffer can be output.

According to a sixth aspect of the present invention there is provided an encoder for arranging media data in transmission units comprising:
an input for inputting media data;
a handler for including the media data in data transmission units;
an arranger for ordering the data transmission units in a transmission order which is at least partly different from a decoding order of the media data in the data transmission units;
a quantitative indicator for indicating the decoding order for at least part of the transmission units; and
a definer for defining a parameter for a relation of the quantitative indicators of transmission units.

According to a seventh aspect of the present invention there is provided a system comprising
an encoder for arranging media data in transmission units, the encoder comprising:
an input for inputting media data;
a handler for including the media data in data transmission units;
an arranger for ordering the data transmission units in a transmission order which is at least partly different from a decoding order of the media data in the data transmission units;
a quantitative indicator for indicating the decoding order for at least part of the transmission units; and
a definer for defining a parameter for a relation of the quantitative indicators of transmission units;
a transmitter for transmitting the transmission units;
a receiver for receiving the transmission units;
a decoder for decoding media data included in the transmission units,
the decoder comprising:
an input for receiving transmission units;
a buffer for buffering transmission units;
a verifier for checking the relation of two transmission units in the buffer against a parameter defined for a relation of the quantitative indicators of two transmission units, and for providing a result of the checking being indicative of whether at least one of the transmission units in the buffer can be output.

According to an eighth aspect of the present invention there is provided a device comprising
an input for inputting media data;
a handler for including media data in data transmission units;
an arranger for ordering the data transmission units in a transmission order which is at least partly different from a decoding order of the media data in the data transmission units;
a quantitative indicator for indicating the decoding order for at least part of the transmission units; and
a definer for defining a parameter for a relation of the quantitative indicators of transmission units.

According to a ninth aspect of the present invention there is provided a device comprising
an input for inputting transmission units included with media data;
a buffer for buffering received transmission units; and
a verifier for checking the relation of two transmission units in the buffer against a parameter defined for a relation of the quantitative indicators of two transmission units, and for providing a result of the checking being indicative of whether at least one of the transmission units in the buffer can be output.

According to a tenth aspect of the present invention there is provided a wireless communication device comprising
an input for inputting media data;
a handler for including media data in data transmission units;
an arranger for ordering the data transmission units in a transmission order which is at least partly different from a decoding order of the media data in the data transmission units;
a quantitative indicator for indicating the decoding order for at least part of the transmission units; and
a definer for defining a parameter for a relation of the quantitative indicators of transmission units; and
a transmitter for transmitting the transmission units.

According to an eleventh aspect of the present invention there is provided a signal for transmitting media data in data transmission units comprising
the data transmission units ordered in a transmission order which is at least partly different from a decoding order of the media data in the data transmission units;
a quantitative indicator indicating the decoding order for at least part of the transmission units;
a parameter defined for a relation of the quantitative indicators of transmission units.

According to a twelfth aspect of the present invention there is provided a computer program product comprising machine executable steps for buffering media data in a buffer,
the media data being included in data transmission units,
the data transmission units having been ordered in a transmission order which is at least partly different from a decoding order of the media data in the data transmission units,
the decoding order having been indicated with a quantitative indicator for at least part of the transmission units,
wherein the computer program product comprising machine executable steps for:
defining a parameter for a relation of the quantitative indicators of transmission units; and
checking the relation of transmission units in the buffer against the parameter, the result of the checking being indicative of whether at least one of the transmission units in the buffer can be output.

According to a thirteenth aspect of the present invention there is provided a computer program product for arranging media data in transmission units comprising machine executable steps for:
including the media data in data transmission units;
ordering the data transmission units in a transmission order which is at least partly different from a decoding order of the media data in the data transmission units;
indicating the decoding order with a quantitative indicator for at least part of the transmission units; and
defining a parameter for a relation of the quantitative indicators of transmission units.

The present invention may reduce the buffering delay before the decoder can start to decode the media data in the transmission units and output the decoded data.

DETAILED DESCRIPTION OF THE INVENTION

An example of a scheme where the invention can be applied follows. The sequence is spliced into pieces of a number of transmission units. The transmission units are transmitted in the following transmission order, where the numbers indicate the decoding order numbers of the transmission units:

0, 8, 12, 2, 24, 14, 31, . . .

If the decoder buffer receives all the above mentioned transmission units, the calculated maximum (absolute) difference between decoding order numbers of transmission units in the decoding buffer are as follows, if no transmission units are outputted from the buffer:

after the second transmission unit, the difference would be 8 (the absolute difference between the first and the second decoding order number);

after the third transmission unit, the difference would be 12 (the absolute difference between the first and the third decoding order number);

after the fourth transmission unit, the difference would be 12 (the absolute difference between the first and the third decoding order number);

after the fifth transmission unit, the difference would be 24 (the absolute difference between the first and the fifth decoding order number);

after the sixth transmission unit, the difference would be 24 (the absolute difference between the first and the fifth decoding order number);

after the seventh transmission unit, the difference would be 31 (the absolute difference between the first and the seventh decoding order number).

Figure 8:
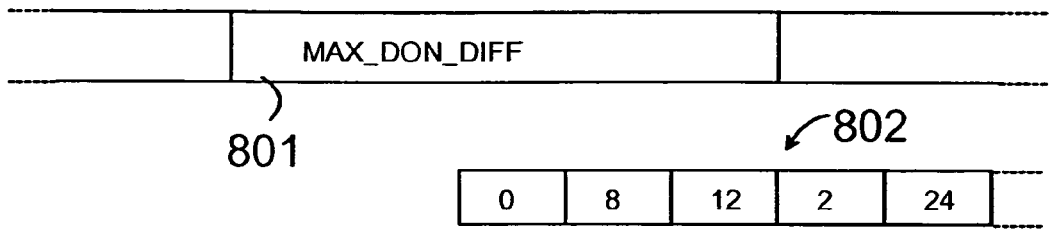
FIG. 8 depicts a signal according to the present invention.

The signal carrying the above described example of a sequence is depicted in FIG. 8 as a reference 802.

Let us assume that a maximum value for the difference is defined as 16. This means that the decoder begins to output the decoded pictures when the fifth transmission unit is received and decoded. The outputting may happen before the fifth transmission unit is stored to the buffer, or after the fifth transmission unit is stored to the buffer, or even simultaneously (in-place replacement).

The reference 801 in FIG. 8 depicts a part of a signal which carries the parameter max-don-diff.

When transmission units are removed from the buffer according to the invention in the above sequence, and the maximum value for the difference is defined as 16, the buffer behaves as follows:

after the second transmission unit, the difference would be 8, and the buffer contents would be [0, 8];

after the third transmission unit, the difference would be 12, and the buffer contents would be [0, 8, 12];

after the fourth transmission unit, the difference would be 12, and the buffer contents would be [0, 8, 12, 2];

after the fifth transmission unit, the difference would be 16, and the buffer contents would be [8, 12, 24], since the maximum difference was exceeded and transmission units 0 and 2 were outputted;

after the sixth transmission unit, the difference would be 16, and the buffer contents would be [8, 12, 24, 14];

after the seventh transmission unit, the difference would be 7, and the buffer contents would be [24, 31], since the maximum difference was exceeded and transmission units 8, 12 and 14 were outputted.

In the situation in which transmission errors exist, the calculated difference values can be different from calculated difference values when no transmission units are lost during transmission. For example, if the decoder receives the following transmission units 0, 8, 2, 24, 14, 31, . . . i.e. the third transmission unit is lost, the decoder calculates the maximum (absolute) difference between decoding order numbers of transmission units in the decoding buffer. The results of the calculation are in this example:

after the second transmission unit, the difference would be 8, and the buffer contents would be [0, 8];

after the third transmission unit, the difference would be 8, and the buffer contents would be [0, 8, 2];

after the fourth transmission unit, the difference would be 16, and the buffer contents would be [8, 24], since the maximum difference was exceeded and transmission units 0 and 2 were outputted;

after the fifth transmission unit, the difference would be 16, and the buffer contents would be [8, 24, 14];

after the sixth transmission unit, the difference would be 7, and the buffer contents would be [24, 31], since the maximum difference was exceeded and transmission units 8 and 14 were outputted.

This means that the condition for the maximum value is fulfilled after the fourth transmission unit is received to the decoder buffer whereafter the decoder may also begin to output the decoded picture after decoding the fourth transmission unit. It can be seen from the above that in this example situation the decoder begins to output the decoded pictures when the transmission unit in which the decoding order number is 24 in both the errorless transmission situation and in the situation in which a transmission unit is lost. The present invention can therefore reduce the extra delay in the outputting of decoded pictures caused by the transmission losses compared to prior art solutions.

In the following, an independent GOP consists of pictures from an IDR picture (inclusive) to the next IDR picture (exclusive) in decoding order. The stored video signals can either be uncoded signals stored before encoding, as encoded signals stored after encoding, or as decoded signals stored after encoding and decoding process. For example, an encoder produces bitstreams in transmission order. A file system receives audio and/or video bitstreams which are encapsulated e.g. in decoding order and stored as a file. The file can be stored into a database from which a streaming server can read the NAL units and encapsulate them into RTP packets.

Furthermore, in the following description the invention is described by using encoder-decoder based system, but it is obvious that the invention can also be implemented in systems where the encoder outputs and transmits coded data to another component, such as a streaming server, in a first order, where the other component reorders the coded data from the first order to another order, defines the required buffer size for the another order and forwards the coded data in its reordered form to the decoder.

Figure 1:
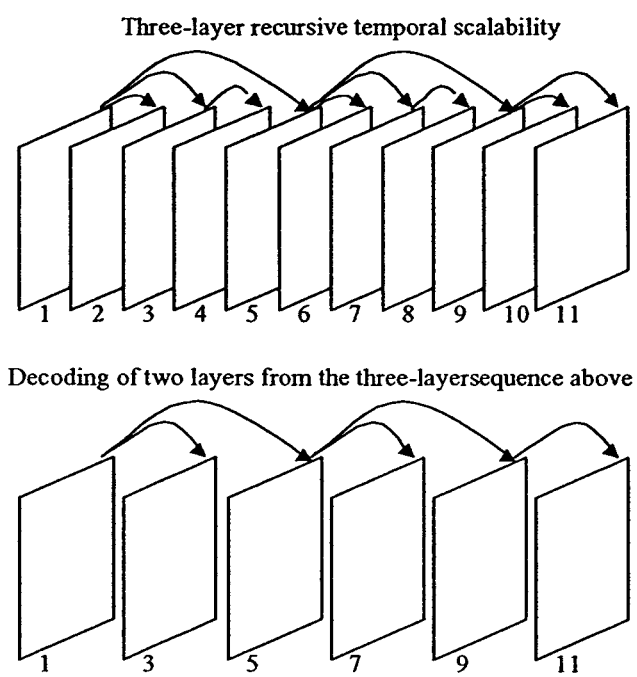
FIG. 1 shows an example of a recursive temporal scalability scheme.
Figure 2:
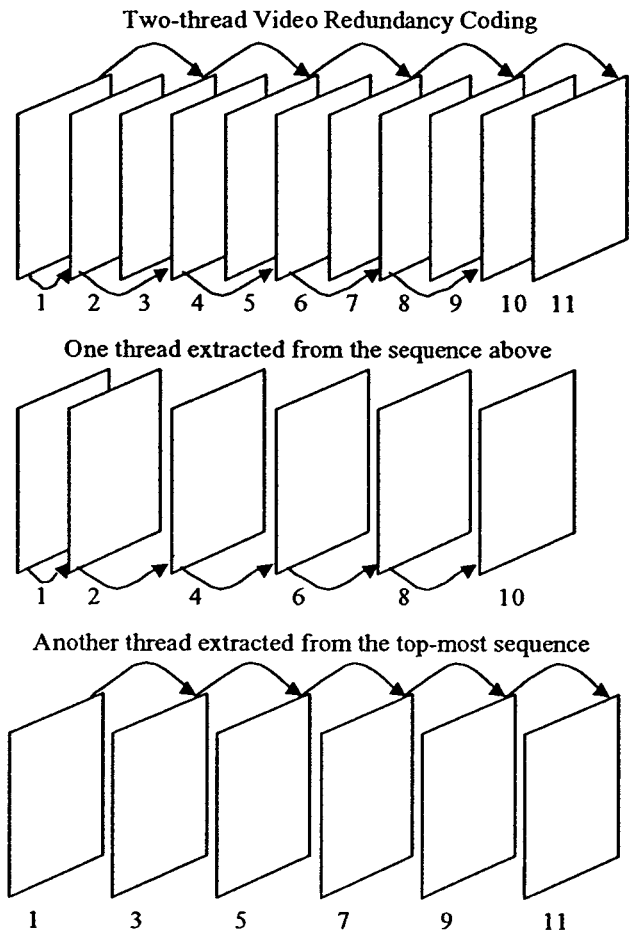
FIG. 2 depicts a scheme referred to as Video Redundancy Coding, where a sequence of pictures is divided into two or more independently coded threads in an interleaved manner.
Figure 3:
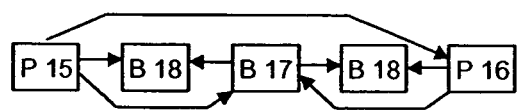
FIG. 3 presents an example of a prediction structure potentially improving compression efficiency.
Figure 4:
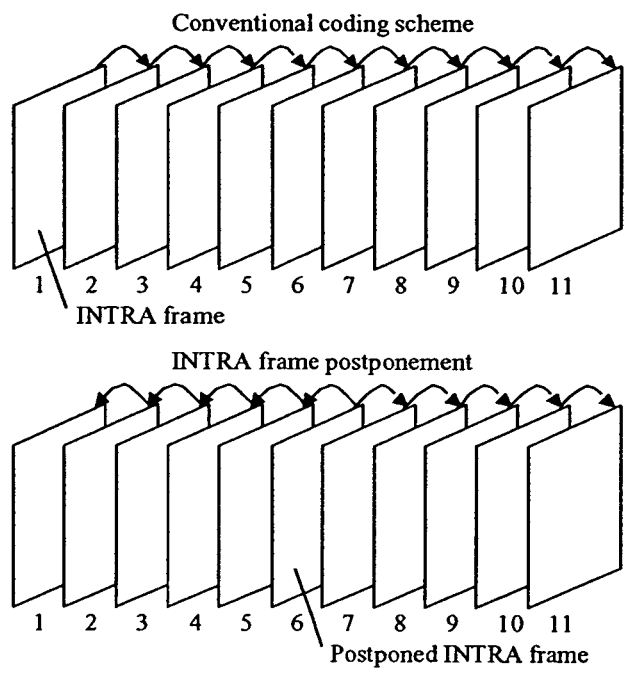
FIG. 4 presents an example of the intra picture postponement method that can be used to improve error resiliency.
Figure 5:
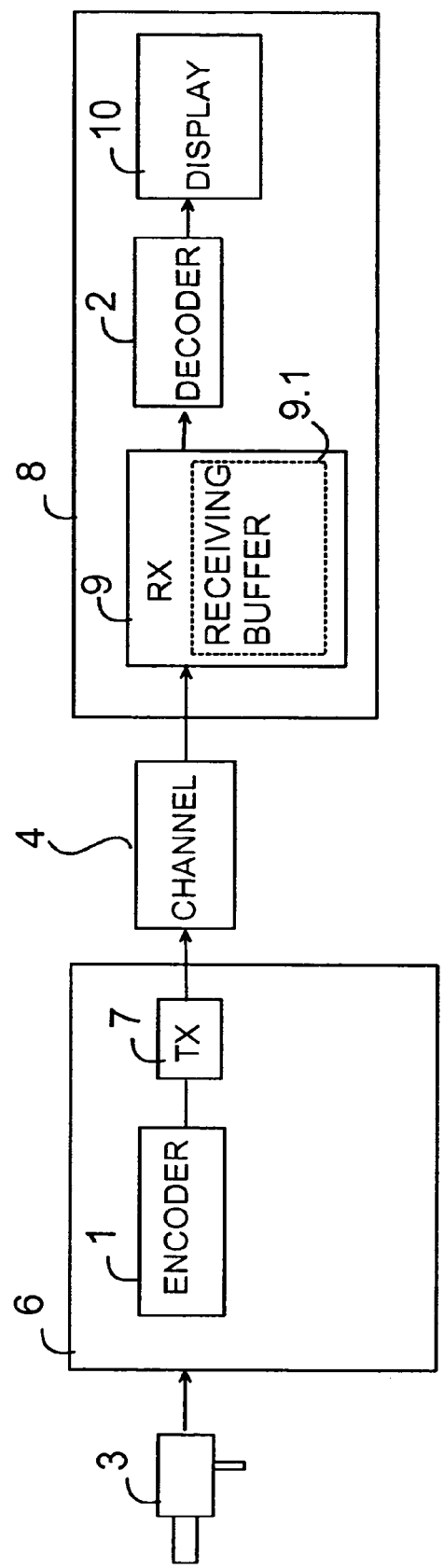
FIG. 5 depicts an advantageous embodiment of the system according to the present invention.
Figure 6:
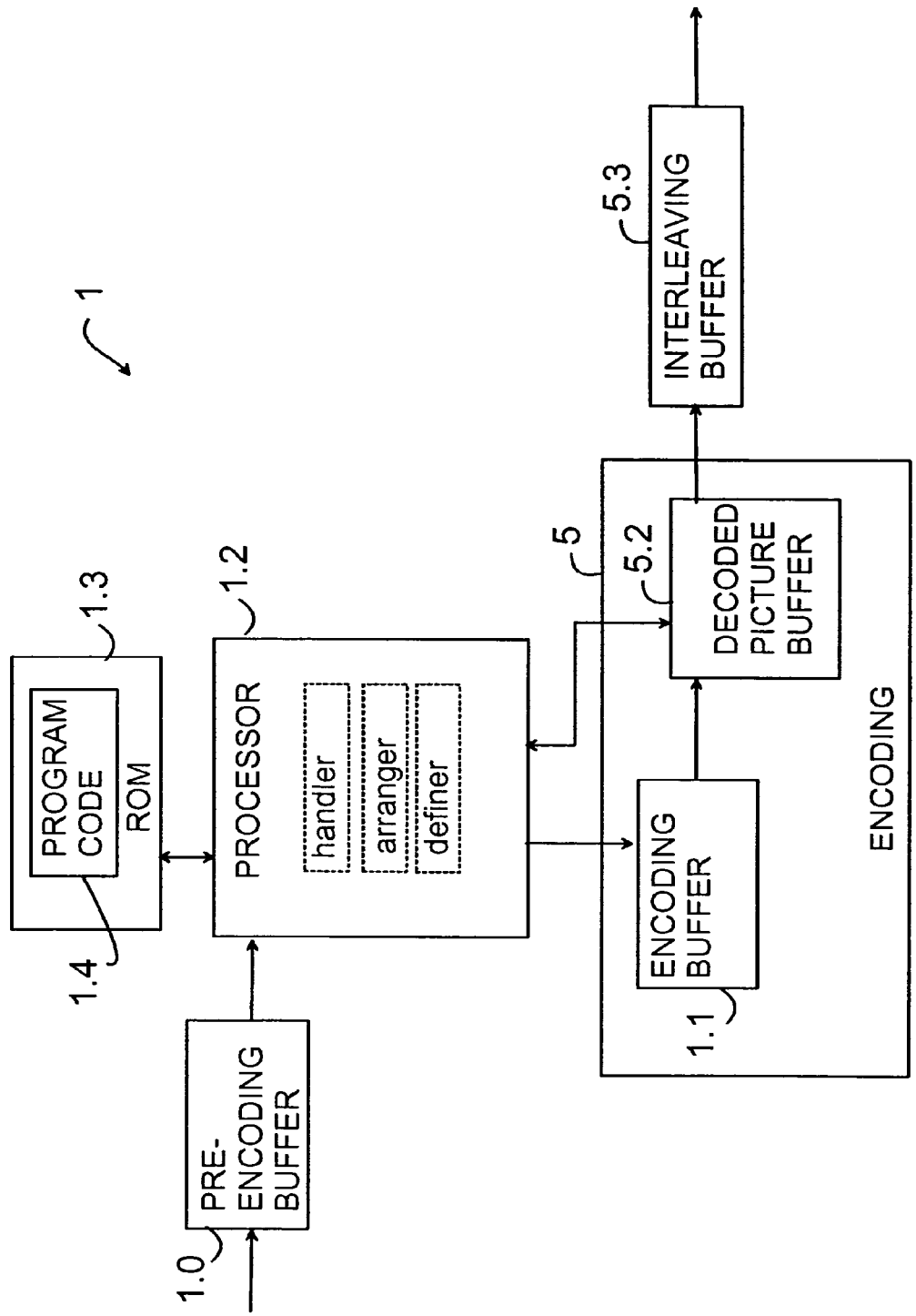
FIG. 6 depicts an advantageous embodiment of the encoder according to the present invention.
Figure 7:
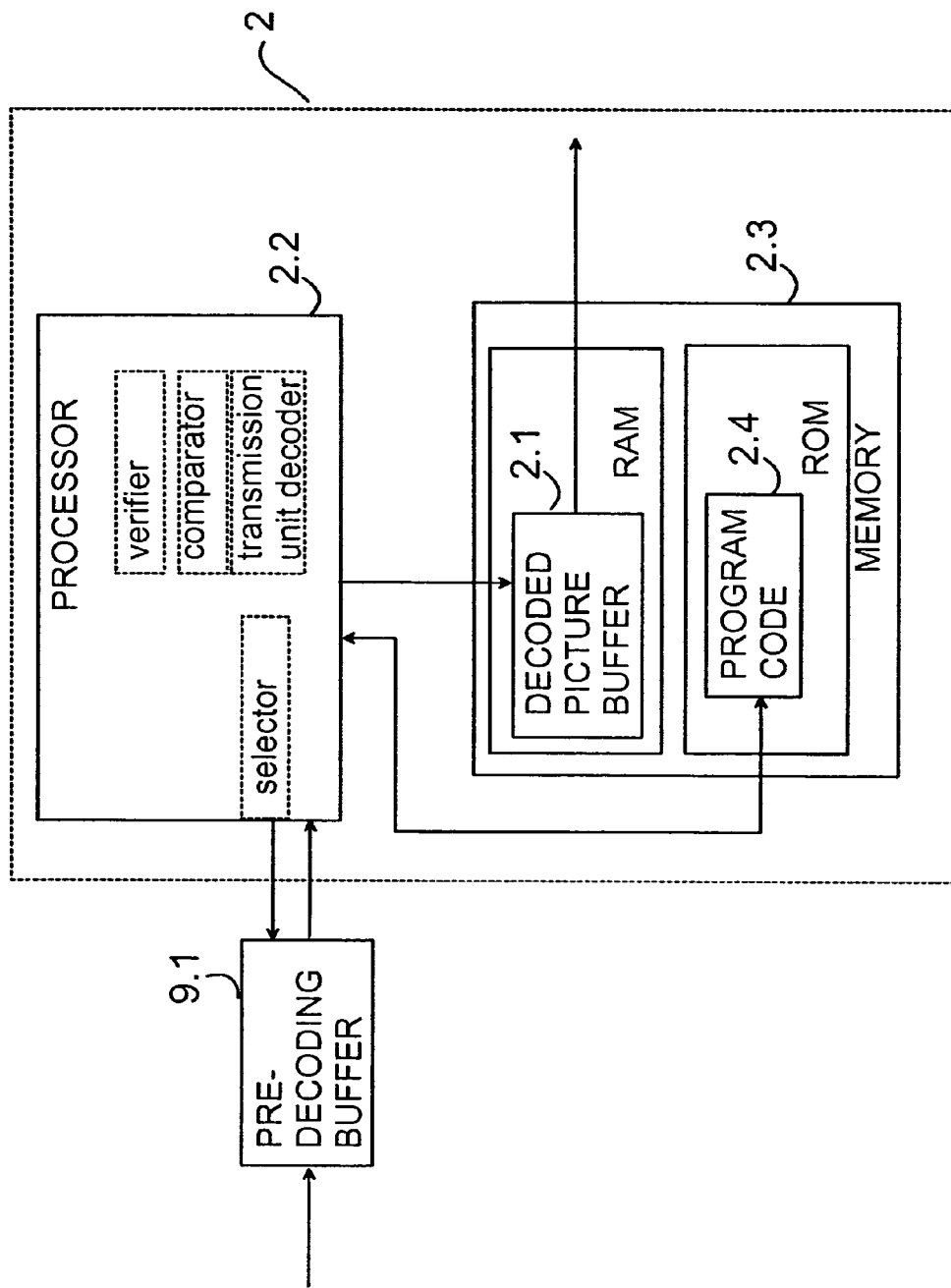
FIG. 7 depicts an advantageous embodiment of the decoder according to the present invention.

In the following the invention will be described in more detail with reference to the system of FIG. 5, the encoder 1 of FIG. 6 and decoder 2 of FIG. 7. The pictures to be encoded can be, for example, pictures of a video stream from a video source 3, e.g. a camera, a video recorder, etc. The pictures (frames) of the video stream can be divided into smaller portions such as slices. The slices can further be divided into blocks. In the encoder 1 the video stream is encoded to reduce the information to be transmitted via a transmission channel 4, or to a storage media (not shown). Pictures of the video stream are input to the encoder 1. The encoder has an encoding buffer 1.1 (FIG. 6) for temporarily storing some of the pictures to be encoded. The encoder 1 also includes a memory 1.3 and a processor 1.2 in which the encoding tasks according to the invention can be applied. The memory 1.3 and the processor 1.2 can be common with the transmitting device 6 or the transmitting device 6 can have another processor and/or memory (not shown) for other functions of the transmitting device 6. The encoder 1 performs motion estimation and/or some other tasks to compress the video stream. In motion estimation similarities between the picture to be encoded (the current picture) and a previous and/or latter picture are searched. If similarities are found the compared picture or part of it can be used as a reference picture for the picture to be encoded. In JVT the display order and the decoding order of the pictures are not necessarily the same, wherein the reference picture has to be stored in a buffer (e.g. in the decoded picture buffer 5.2) as long as it is used as a reference picture. The encoder 1 may also insert information on display order of the pictures into the transmission stream.

From the encoding process the encoded pictures are moved as NAL units to an picture interleaving buffer 5.3, if necessary. Furthermore, the encoded reference pictures are decoded and inserted into the decoded picture buffer 5.2 of the encoder. The encoded pictures are transmitted from the encoder 1 to the decoder 2 via the transmission channel 4. In the decoder 2 the encoded pictures are decoded to form uncompressed pictures corresponding as much as possible to the encoded pictures.

The decoder 1 also includes a memory 2.3 and a processor 2.2 in which the decoding tasks according to the invention can be applied. The memory 2.3 and the processor 2.2 can be common with the receiving device 8 or the receiving device 8 can have another processor and/or memory (not shown) for other functions of the receiving device 8.

Encoding

Let us now consider the encoding-decoding process in more detail. Pictures from the video source 3 are entered to the encoder 1 and advantageously stored in the encoding buffer 1.1. The encoding process is not necessarily started immediately after the first picture is entered to the encoder, but after a certain amount of pictures are available in the encoding buffer 1.1. Then the encoder 1 tries to find suitable candidates from the pictures to be used as the reference frames for motion estimation. The encoder 1 then performs the encoding to form encoded pictures. The encoded pictures can be, for example, predicted pictures (P), bi-predictive pictures (B), and/or intra-coded pictures (I). The intra-coded pictures can be decoded without using any other pictures, but other type of pictures need at least one reference picture before they can be decoded. Pictures of any of the above mentioned picture types can be used as a reference picture.

The encoder attaches for example two time stamps to the pictures: a decoding time stamp (DTS) and output time stamp (OTS). The decoder can use the time stamps to determine the correct decoding time and time to output (display) the pictures. However, those time stamps are not necessarily transmitted to the decoder or it does not use them.

The NAL units can be delivered in different kinds of packets. In this advantageous embodiment the different packet formats include single NAL unit packets and aggregation packets. The aggregation packets can further be divided into single-time aggregation packets (STAPs) and multi-time aggregation packets (MTAPs).

A video sequence according to this specification can be any part of NALU stream that can be decoded independently from other parts of the NALU stream.

The buffering model is presented next. The pre-encoding buffer 1.0, decoded picture buffer 5.2 and interleaving buffer 5.3 are initially empty. Uncompressed pictures in capturing order are inserted to the pre-encoding buffer. When any temporal scalability scheme is applied, more than one uncompressed picture is buffered in the pre-encoding buffer before encoding. After this initial pre-encoding buffering, the encoding process starts. The encoder 5 performs the encoding process. As a result of the encoding process, the encoder produces decoded reference pictures and NAL units and removes picture that was encoded from the pre-encoding buffer. The decoded reference pictures are inserted in the decoded picture buffer 5.2 and NAL units are inserted in the interleaving buffer 5.3. The transmitting device selects NAL units from the interleaving buffer to be transmitted. A transmitted NAL unit is removed from the interleaving buffer.

Transmission

The transmission and/or storing of the encoded pictures (and the optional virtual decoding) can be started immediately after the first encoded picture is ready. This picture is not necessarily the first one in decoder output order because the decoding order and the output order may not be the same.

When the first picture of the video stream is encoded the transmission can be started. The encoded pictures are optionally stored to the interleaving buffer 5.3. The transmission can also start at a later stage, for example, after a certain part of the video stream is encoded.

The decoder 2 should also output the decoded pictures in correct order, for example by using the ordering of the picture order counts, and hence the reordering process need be defined clearly and normatively.

De-Packetizing

The de-packetization process is implementation dependent. Hence, the following description is a non-restrictive example of a suitable implementation. Other schemes may be used as well. Optimizations relative to the described algorithms are likely possible.

The general concept behind these de-packetization rules is to reorder NAL units from transmission order to the NAL unit delivery order.

The receiver 8 collects all packets belonging to a picture, bringing them into a reasonable order. The strictness of the order depends on the profile employed. The received packets are stored into the receiving buffer 9.1 (pre-decoding buffer, de-interleaving buffer). The receiver 8 discards anything that is unusable, and passes the rest to the decoder 2.

Figure 9:
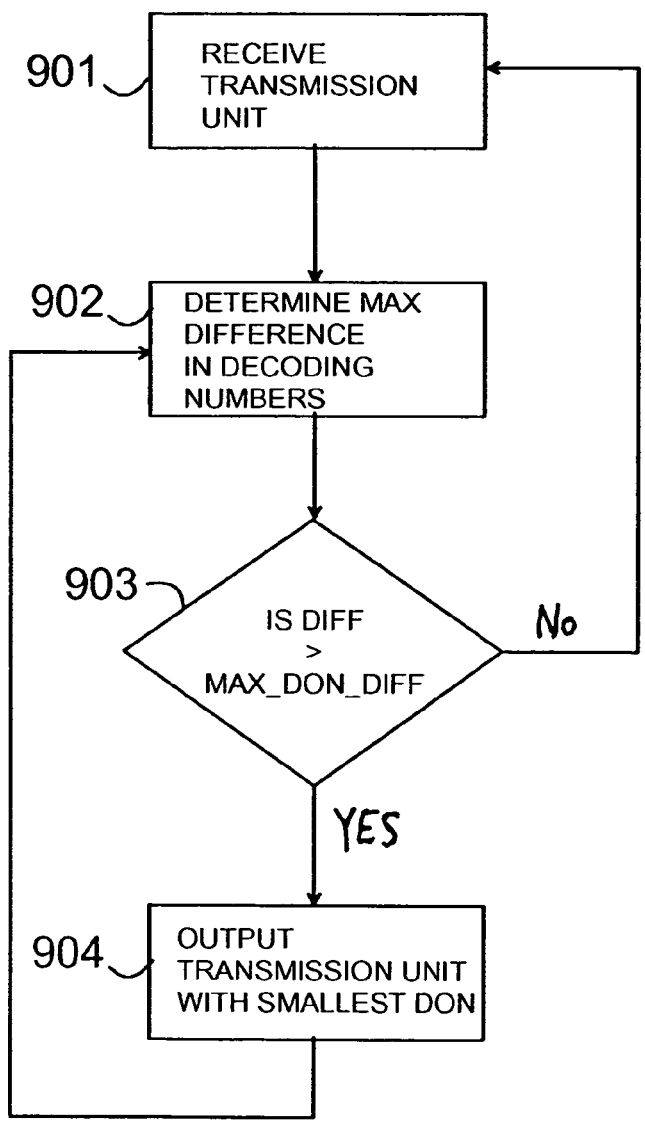
FIG. 9 depicts a diagram of the method and a computer program according to the present invention employing the use of the quantitative indicator of the decoding order.

In the following there is a description of the de-packetization process according to an example embodiment of the present invention with reference to FIG. 9.

The receiver receives (block 901 in FIG. 9) and stores incoming NAL units in reception order into the de-interleaving buffer as follows. NAL units of aggregation packets are stored into the de-interleaving buffer individually. Those NALUs are processed as if they were received in separate RTP packets, in the order they were arranged in the aggregation packet. The value of DON is calculated and stored for all NAL units.

Function AbsDON denotes such decoding order number of the NAL unit that does not wrap around to 0 after 65535. In other words, AbsDON is calculated as follows: Let m and n are consecutive NAL units in transmission order. For the very first NAL unit in transmission order (whose index is 0), AbsDON(0)=DON(0). For other NAL units, AbsDON is calculated as follows:

If $DON(m)==DON(n)$, $AbsDON(n)=AbsDON(m)$

If $(DON(m)<DON(n)$ and $DON(n)-DON(m)<32768)$, $AbsDON(n)=AbsDON(m)+DON(n)-DON(m)$ If $(DON(m)>DON(n)$ and $DON(m)-DON(n)>=32768)$, $AbsDON(n)=AbsDON(m)+65536-DON(m)+DON(n)$ If $(DON(m)<DON(n)$ and $DON(n)-DON(m)>=32768)$, $AbsDON(n)=AbsDON(m)-(DON(m)+65536-DON(n))$ If $(DON(m)>DON(n)$ and $DON(m)-DON(n)<32768)$, $AbsDON(n)=AbsDON(m)-(DON(m)-DON(n))$ where DON(i) is the decoding order number of the NAL unit having index i in the transmission order.

Parameter sprop-max-don-diff is an integer in the range of 0 to 32767, inclusive. sprop-max-don-diff is calculated as follows (902):

$$\text{sprop-max-don-diff}=\max\{AbsDON(i)-AbsDON(j)\},$$
for any $i$ and any $j>i$, where i and j indicate the index of the NAL unit in the transmission order.

The NAL units to be removed from the de-interleaving buffer are determined (903) as follows:

All NAL units m for which don_diff(m,n) is greater than sprop-max-don-diff are removed (904) from the de-interleaving buffer and passed to the decoder in the order specified below. Herein, n corresponds to the NAL unit having the greatest value of AbsDON among the received NAL units.

The order that NAL units are passed to the decoder is specified as follows:

Let PDON be a variable that is initialized to 0 at the beginning of the an RTP session.

For each NAL unit associated with a value of DON, a DON distance is calculated as follows. If the value of DON of the NAL unit is larger than the value of PDON, the DON distance is equal to DON−PDON. Otherwise, the DON distance is equal to 65535−PDON+DON+1.

NAL units are delivered to the decoder in ascending order of DON distance. If several NAL units share the same value of DON distance, they can be passed to the decoder in any order.

When a desired number of NAL units have been passed to the decoder, the value of PDON is set to the value of DON for the last NAL unit passed to the decoder.

Figure 10:
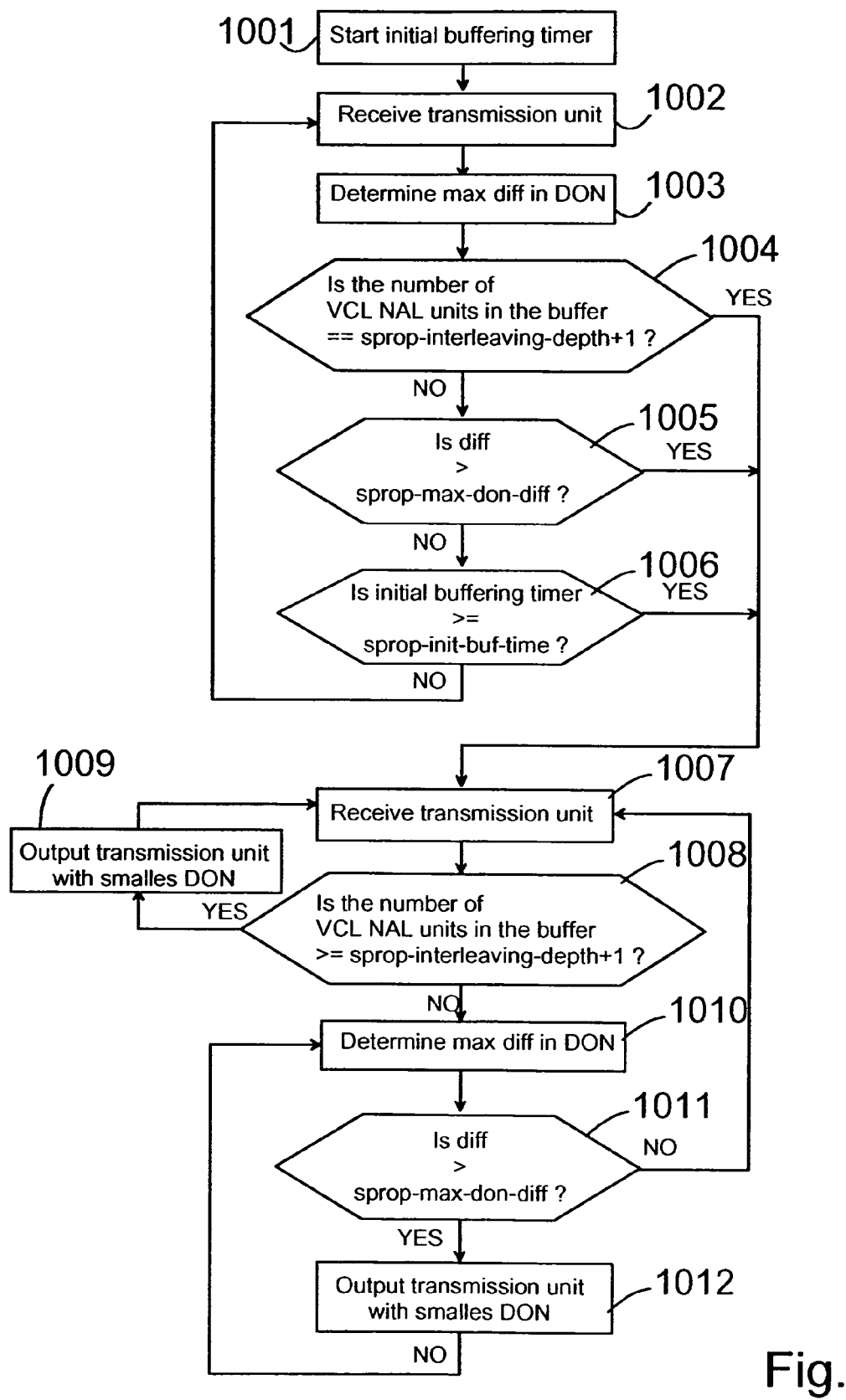
FIG. 10 depicts a diagram of the method and a computer program according to the present invention employing the use of the quantitative indicator of the decoding order and an indicator of the transmission unit order.

In the following there is a description of the de-packetization process according to an example embodiment of the present invention with reference to FIG. 10. There are two buffering states in the receiver: initial buffering (blocks 1001-1006 in FIG. 10) and buffering while playing (blocks 1007-1012 in FIG. 10). Initial buffering occurs when the RTP session is initialized. After initial buffering, decoding and playback is started and the buffering-while-playing mode is used.

Regardless of the buffering state the receiver stores (block 1002) incoming NAL units in reception order into the de-interleaving buffer as follows. NAL units of aggregation packets are stored into the de-interleaving buffer individually. Those NALUs are processed as if they were received in separate RTP packets, in the order they were arranged in the aggregation packet. The value of DON is calculated and stored for all NAL units.

Function AbsDON denotes such decoding order number of the NAL unit that does not wrap around to 0 after 65535. In other words, AbsDON is calculated as follows: Let m and n are consecutive NAL units in transmission order. For the very first NAL unit in transmission order (whose index is 0), AbsDON(0)=DON(0). For other NAL units, AbsDON is calculated as follows:

If $DON(m)==DON(n)$, $AbsDON(n)=AbsDON(m)$

If ($DON(m)<DON(n)$ and $DON(n)-DON(m)<32768$), $AbsDON(n)=AbsDON(m)+DON(n)-DON(m)$ If ($DON(m)>DON(n)$ and $DON(m)-DON(n)>=32768$), $AbsDON(n)=AbsDON(m)+65536-DON(m)+DON(n)$ If ($DON(m)<DON(n)$ and $DON(n)-DON(m)>=32768$), $AbsDON(n)=AbsDON(m)-(DON(m)+65536-DON(n))$ If ($DON(m)>DON(n)$ and $DON(m)-DON(n)<32768$), $AbsDON(n)=AbsDON(m)-(DON(m)-DON(n))$ where DON(i) is the decoding order number of the NAL unit having index i in the transmission order.

Parameter sprop-interleaving-depth of the JVT codec specifies the maximum number of VCL NAL units that precede any VCL NAL unit in the NAL unit stream in transmission order and follow the VCL NAL unit in decoding order. Constant N is the value of the sprop-interleaving-depth parameter incremented by 1.

Parameter sprop-max-don-diff is an integer in the range of 0 to 32767, inclusive. If sprop-max-don-diff is not present, the value of the parameter is unspecified. sprop-max-don-diff is calculated as follows:

sprop-max-don-diff=max{$AbsDON(i)-AbsDON(j)$}, for any $i$ and any $j>i$(1003), where i and j indicate the index of the NAL unit in the transmission order.

Parameter sprop-init-buf-time signals the initial buffering time that a receiver must buffer before starting decoding to recover the NAL unit decoding order from the transmission order. The parameter is the maximum value of (transmission time of a NAL unit—decoding time of the NAL unit) assuming reliable and instantaneous transmission, the same timeline for transmission and decoding, and starting of decoding when the first packet arrives.

Initial buffering lasts until one of the following conditions is fulfilled:

There are N VCL NAL units in the de-interleaving buffer (1004).

If sprop-max-don-diff is present, don_diff(m,n) is greater than the value of sprop-max-don-diff (1005), in which n corresponds to the NAL unit having the greatest value of AbsDON among the received NAL units and m corresponds to the NAL unit having the smallest value of AbsDON among the received NAL units.

Initial buffering has lasted for the duration equal to or greater than the value of the sprop-init-buf-time parameter (1006).

The NAL units to be removed from the de-interleaving buffer are determined as follows:

If the de-interleaving buffer contains at least N VCL NAL units (1008), NAL units are removed from the de-interleaving buffer and passed to the decoder in the order specified below until the buffer contains N−1 VCL NAL units (1009).

If sprop-max-don-diff is present, all NAL units m for which don_diff(m,n) is greater than sprop-max-don-diff (1011) are removed from the de-interleaving buffer and passed to the decoder in the order specified below (1012). Herein, n corresponds to the NAL unit having the greatest value of AbsDON among the received NAL units.

The order that NAL units are passed to the decoder is specified as follows:

Let PDON be a variable that is initialized to 0 at the beginning of the an RTP session.

For each NAL unit associated with a value of DON, a DON distance is calculated as follows. If the value of DON of the NAL unit is larger than the value of PDON, the DON distance is equal to DON−PDON. Otherwise, the DON distance is equal to 65535−PDON+DON+1.

NAL units are delivered to the decoder in ascending order of DON distance. If several NAL units share the same value of DON distance, they can be passed to the decoder in any order.

When a desired number of NAL units have been passed to the decoder, the value of PDON is set to the value of DON for the last NAL unit passed to the decoder.

Decoding

The DPB 2.1 contains memory places for storing a number of pictures. Those places are also called as frame stores in the description. The decoder 2 decodes the received pictures in the order they are removed from the de-interleaving buffer (i.e. in decoding order).

The present invention can be applied in many kinds of systems and devices. The transmitting device 6 including the encoder 1 advantageously include also a transmitter 7 to transmit the encoded pictures to the transmission channel 4. The receiving device 8 include the receiver 9 to receive the encoded pictures, the decoder 2, and a display 10 on which the decoded pictures can be displayed. The transmission channel can be, for example, a landline communication channel and/or a wireless communication channel. The transmitting device and the receiving device include also one or more processors 1.2, 2.2 which can perform the necessary steps for controlling the encoding/decoding process of video stream according to the invention. Therefore, the method according to the present invention can mainly be implemented as machine executable steps of the processors. The buffering of the pictures can be implemented in the memory 1.3, 2.3 of the devices. The program code 1.4 of the encoder can be stored into the memory 1.3. Respectively, the program code 2.4 of the decoder can be stored into the memory 2.3.

The invention claimed is:
1. A method comprising:
buffering encoded media data in a buffer, the encoded media data being included in network transmission units, the network transmission units having been ordered in a transmission order which is at least partly different from a decoding order of the encoded media data in the network transmission units, the decoding order having been indicated for at least one part of the network transmission units;

defining, in a processor, a difference in decoding order for the at least one network transmission unit;

utilizing, in the processor, a maximum difference in decoding order for the network transmission units in the buffer; and checking, in the processor, the maximum difference in decoding order for the network transmission units in the buffer against the difference in decoding order for the at least one network transmission unit, the result of the checking being indicative of at least one network transmission unit in the buffer preceding, in decoding order, any network transmission unit in a sequence of network transmission units not having been buffered in the buffer before the checking.

2. The method according to claim 1 comprising using the result of the checking to determine whether a network transmission unit can be outputted from the buffer, and removing the network transmission unit if it was determined that the network transmission unit could be outputted.

3. The method according to claim 2 comprising decoding the encoded media data being included in the network transmission unit that was outputted from the buffer.

4. The method according to claim 3 comprising obtaining the output of said at least one network transmission unit from the buffer as a result of said at least one network transmission unit in the buffer preceding, in decoding order, any network transmission unit in a sequence of network transmission units not yet buffered in the buffer.

5. A method according to claim 1 comprising using a decoding order number as the indicator of decoding order; and wherein the maximum difference in decoding order is a maximum difference in decoding order number, and wherein the maximum difference decoding order number represents the maximum allowable difference in decoding order numbers between any two network transmission units in the buffer.

6. A method comprising:

buffering encoded media data in a buffer, the encoded media data being included in network transmission units, the network transmission units having been ordered in a transmission order which is at least partly different from a decoding order of the encoded media data in the network transmission units, the decoding order having been indicated for at least one of the network transmission units;

defining, in a processor, a difference in decoding order for the at least one network transmission unit;

utilizing, in the processor, a maximum difference in decoding order for the network transmission units in the buffer; and checking, in the processor, the maximum difference in decoding order for the network transmission units in the buffer against the difference in decoding order for the at least one network transmission unit, the result of the checking being indicative of whether at least one of the network transmission units in the buffer can be outputted.

7. The method according to claim 6 comprising using the result of the checking to determine whether a network transmission unit can be outputted from the buffer.

8. The method according to claim 7 comprising determining which network transmission unit can be outputted from the buffer and outputting the network transmission unit from the buffer if it was determined that the network transmission unit could be outputted.

9. The method according to claim 6 comprising decoding the encoded media data being included in the network transmission unit that was outputted from the buffer.

10. The method according to claim 6 comprising obtaining the output of said at least one network transmission unit from the buffer as a result of said at least one network transmission unit in the buffer preceding, in decoding order, any network transmission unit in a sequence of network transmission units not yet buffered in the buffer.

11. The method according to claim 6 comprising using a decoding order number as the indicator of decoding order.

12. The method according to claim 11, wherein the maximum difference in decoding order is a maximum difference in decoding order number, wherein the maximum difference decoding order number represents the maximum allowable difference in decoding order numbers between any two network transmission units in the buffer.

13. The method according to claim 12 comprising determining two such network transmission units in the buffer, whose difference in the decoding order number is the maximum difference in decoding order number, and outputting from the buffer the earlier one of the network transmission units in the decoding order.

14. The method according to claim 12, wherein checking comprises determining if said maximum difference in decoding order number is greater or equal to a difference in decoding order number between two network transmission units in the buffer, and outputting from the buffer an earlier one of the two network transmission units in decoding order.

15. The method according to claim 14 comprising determining two network transmission units in the buffer, having a difference in the decoding order number equal to said maximum difference in decoding order number, and outputting from the buffer an earlier one of said two network transmission units in the decoding order.

16. The method according to claim 6 comprising defining a second parameter indicative of a maximum number of network transmission units that precede any network transmission unit in a packet stream in the transmission order and follow the network transmission unit in the decoding order.

17. The method according to claim 16 comprising checking the number of network transmission units in the buffer against the second parameter; and outputting a network transmission unit from the buffer if the result of the checking indicates that the number of network transmission units in the buffer exceeds the value of the second parameter.

18. The method according to claim 6, wherein the maximum difference in decoding order is represented by a sprop-max-don-diff parameter, and wherein the decoding order is an absolute decoding order.

19. A method for transmitting encoded media data comprising:

including, in a processor, the encoded media data in network transmission units;

ordering, in the processor, the network transmission units in a transmission order which is at least partly different from a decoding order of the encoded media data in the network transmission units;

indicating, in the processor, the decoding order with a decoding order number for at least part of the network transmission units;

defining, in the processor, a parameter indicating the maximum difference in decoding order of the network transmission units;

transmitting the network transmission units to a receiver;

receiving the network transmission units in the receiver;

buffering the received network transmission units in a buffer, defining, in the processor, a difference in decoding order for the network transmission units; and checking, in the processor, the parameter indicating the maximum difference in decoding order of the network transmission units in the buffer against the difference in decoding order for the network transmission units;

the result of the checking being indicative of at least one network transmission unit in the buffer preceding, in decoding order, any network transmission unit in a sequence of network transmission units not having been buffered in the buffer before the checking.

20. A decoder for decoding media data, the media data being included in network transmission units, the network transmission units having been ordered in a transmission order which is at least partly different from a decoding order of the media data in the network transmission units; and the decoding order having been indicated for at least part of the network transmission units;

the decoder comprising:

an input for receiving the network transmission units;

a buffer for buffering the network transmission units; and a verifier for checking a difference in decoding order of two network transmission units in the buffer against a maximum difference in decoding order for the network transmission units in the buffer, and for providing a result of the checking indicative of whether at least one of the network transmission units in the buffer can be outputted.

21. The decoder according to claim 20 comprising an output for outputting network transmission units from the buffer, the output comprising an input for inputting said result of the checking to determine whether a network transmission unit can be outputted from the buffer.

22. The decoder according to claim 21 comprising a selector for determining which network transmission unit can be removed from the buffer and for providing an indication to the output for outputting the network transmission unit from the buffer if it was determined that the network transmission unit could be outputted.

23. The decoder according to claim 20 comprising a network transmission unit decoder for decoding the network transmission unit that was outputted from the buffer.

24. The decoder according to claim 21 wherein a decoding order number is the decoding order indicator, and wherein the maximum difference in decoding order is indicated by a maximum difference in decoding order number.

25. The decoder according to claim 24 comprising a calculator for determining for the network transmission units in the buffer, in relation to other network transmission units in the buffer, a maximum difference in decoding order number.

26. The decoder according to claim 24 wherein a calculator is able to determine two such network transmission units in the buffer, whose difference in the decoding order number is the maximum difference in decoding order number, and providing an indication to said output for outputting from the buffer an earlier one of the network transmission units in the decoding order.

27. The decoder according to claim 24, the verifier comprising a comparator for comparing a maximum difference in decoding order number with difference in decoding order number, wherein if said maximum difference in decoding order number is greater or equal than said parameter, wherein said comparator is adapted to provide an indication to said output for outputting a network transmission unit from the buffer.

28. The decoder according to claim 27, the verifier is able to determine two network transmission units in the buffer, having a difference in the decoding order number equal to said maximum difference in decoding order number, wherein said comparator is able to provide an indication to said output for output from the buffer the earlier one of said two network transmission units in the decoding order.

29. The decoder according to claim 20 comprising a second parameter indicative of a maximum number of network transmission units that precede any network transmission unit in a packet stream in the transmission order and follow the network transmission unit in the decoding order.

30. The decoder according to claim 29 wherein the verifier is able to check the number of network transmission units in the buffer against the second parameter; and output a network transmission unit from the buffer if a result of the checking indicates that the number of network transmission units in the buffer exceeds the value of the second parameter.

31. The decoder according to claim 20, wherein the maximum difference in decoding order is represented by a sprop-max-don-diff parameter, and wherein the decoding order is an absolute decoding order.

32. A module for buffering media data, the media data being included in network transmission units, the network transmission units having been ordered in a transmission order which is at least partly different from a decoding order of the media data in the network transmission units; and the decoding order having been indicated for at least part of the network transmission units;

the module comprising:

an input for receiving the network transmission units;

a verifier for checking a difference in decoding order of two network transmission units in a buffer against a maximum difference in decoding order for the network transmission units in the module, and for providing a result of the checking indicative of whether at least one of the network transmission units in the buffer can be outputted.

33. A wireless communication device comprising:

a receiver for receiving network transmission units included with media data;

a buffer for buffering received network transmission units; and a verifier for checking a difference in decoding order of two network transmission units in the buffer against a maximum difference in decoding order for the network transmission units in the module, and for providing a result of the checking indicative of whether at least one of the network transmission units in the buffer can be output.

34. A computer program product comprising non-transitory computer readable medium bearing computer program code embodied therein for use with a computer, the computer program code comprising:

code for buffering encoded media data in a buffer, the encoded media data being included in network transmission units, the network transmission units having been ordered in a transmission order which is at least partly different from a decoding order of the encoded media data in the network transmission units, the decoding order having been indicated for at least one of the network transmission units;

code for defining a difference in decoding order for the at least one network transmission unit;

code for utilizing a maximum difference in decoding order for the network transmission units in the buffer; and code for checking the maximum difference in decoding order for the network transmission units in the buffer against the difference in decoding order for the at least one transmission units, the result of the checking being indicative of whether at least one of the network transmission units in the buffer can be outputted.

* * * * *

UNITED STATES PATENT AND TRADEMARK OFFICE
CERTIFICATE OF CORRECTION

| | | |
|---|---|---|
| PATENT NO. | : 9,124,907 B2 | Page 1 of 1 |
| APPLICATION NO. | : 10/958671 | |
| DATED | : September 1, 2015 | |
| INVENTOR(S) | : Hannuksela | |

It is certified that error appears in the above-identified patent and that said Letters Patent is hereby corrected as shown below:

In the claims:

<u>Column 19,</u>
Line 31, "A method" should read --The method--.

Signed and Sealed this
Fifteenth Day of March, 2016

Michelle K. Lee
*Director of the United States Patent and Trademark Office*